3,701,825
STABILIZATION OF HYDROGEN PEROXIDE WITH ETHYLENEDIAMINE TETRA (METHYLENE-PHOSPHONIC ACID)
Kenneth J. Radimer, Little Falls, and Theodore F. Munday, Kendall Park, N.J., assignors to FMC Corporation, New York, N.Y.
No Drawing. Filed Oct. 23, 1970, Ser. No. 83,606
Int. Cl. C01b 15/02; C07d 105/02
U.S. Cl. 423—273                                    9 Claims

ABSTRACT OF THE DISCLOSURE

An aqueous hydrogen peroxide solution is stabilized against decomposition by contaminants such as cations of iron, copper, manganese, and the like, by addition of a water-soluble ethylenediamine tetra(methylenephosphonic acid) compound. This stabilized hydrogen peroxide solution is substantially less corrosive towards metals, especially aluminum, than prior stabilized hydrogen peroxide solutions. A synergistic improvement in stability comprises combining a water-soluble tin compound with the ethylenediamine tetra(methylenephosphonic acid) compound and the hydrogen peroxide. The incorporation of nitrate ion into the stabilized hydrogen peroxide solution provides a solution which is of especially low corrosivity towards metals, particularly aluminum, in comparison with hydrogen peroxide solutions stabilized with other stabilizers in the presence of nitrates.

BACKGROUND OF THE INVENTION

(A) Field of the invention

Our invention relates to stabilizing hydrogen peroxide solutions against decomposition, especially contaminant-induced decomposition. Furthermore, our invention relates to reducing the corrosion of metals by stabilized hydrogen peroxide solutions.

(B) Description of the prior art

Many applications for hydrogen peroxide require a relatively dilute solution, less than 40% by weight, in water. Such applications include various chemical reactions and bleaching of textiles, paper-making pulps, and oils. Present commercial practice is to produce and ship a concentrated hydrogen peroxide solution (70 to 90% by weight in water) which is diluted with water at a point of use to any desired concentration (usually between 30 and 50%). This procedure greatly reduces shipping and storage costs as compared with shipping and storing diluted hydrogen peroxide, because a substantial amount of water is not shipped and stored but added where the hydrogen peroxide is used.

However, a serious problem is encountered in shipping concentrated hydrogen peroxide and diluting it at the end use site. Typical waters available for dilution at the point of use are not de-ionized water such as is used in producing hydrogen peroxide, but rather contain various contaminants that induce decomposition of hydrogen peroxide. These decomposition-inducing contaminants include cations of iron, copper, manganese and the like. Decomposition of concentrated hydrogen peroxide can proceed very violently, and therefore storing and shipping unstabilized concentrated hydrogen peroxide can be very hazardous.

The decomposition problem associated with shipping concentrated hydrogen peroxide was partially solved by adding stabilizers to concentrated hydrogen peroxide solutions. The stabilizers reduced the amount of decomposition caused by contaminants and therefore made the shipping of concentrated hydrogen peroxide economically feasible and relatively safe. However, the prior stabilized hydrogen peroxide solutions corroded aluminum tanks used to store the hydrogen peroxide. This corrosion problem was partially corrected by adding sodium nitrate to the stabilized hydrogen peroxide solution.

Stabilizers developed heretofore for use with concentrated hydrogen peroxide include those described in: U.S. Pat. 2,624,655 issued to F. P. Greenspan for stabilizing hydrogen peroxide solutions with dipicolinic acid, quinolinic acid, 6-methyl picolinic acid, or pyridine carboxylic acid (with or without a phosphate and/or a molecularly dehydrated phosphate); U.S. Pat. 3,122,417 issued to B. Blaser et al. for stabilizing hydrogen peroxide solutions with specific alkylidene diphosphonic acids, among many other compounds less relevant to this application; U.S. Pat. 3,234,140 issued to R. Irani for stabilizing peroxy solutions with specific amino tri(lower alkylidenephosphonic) acids or their water-soluble alkali metal, ammonium or amine salts; U.S. Pat. 3,383,174 issued to G. T. Carnine et al. for stabilizing hydrogen peroxide solutions with the synergistic combination of a soluble tin compound and nitrilo tri(methylenephosphonic acid); and, U.S. Pat. 3,387,939 issued to V. J. Riely et al. for stabilizing hydrogen peroxide solutions with a combination of ammonium or alkali metal stannates and certain alkylidene diphosphonic acids.

These prior stabilizers have some ability to inhibit decomposition of hydrogen peroxide in the presence of contaminants. However, these stabilized hydrogen peroxide solutions corrode aluminum and other metals which are contacted by the stabilized hydrogen peroxide, and while the addition of sodium nitrate to the stabilized hydrogen peroxide has reduced this corrosive effect, the level of corrosion has not been sufficiently lowered to satisfy many end-use requirements.

SUMMARY OF THE INVENTION

We have found that water-soluble ethylenediamine tetra(methylenephosphonic acid) compounds are superior stabilizers for hydrogen peroxide solutions and that the presence of water-soluble tin compounds substantially enhances the effectiveness of these compounds in stabilizing hydrogen peroxide solutions. Furthermore, the metal-corrosion tendency of hydrogen peroxide stabilized with these compounds and also containing nitrate ion is considerably reduced in comparison to hydrogen peroxide solutions stabilized with prior art stabilizers and containing nitrate ion.

DETAILED DESCRIPTION OF THE INVENTION

We have now found that aqueous hydrogen peroxide solutions can be stabilized effectively against decomposition caused by contaminants, for example, iron, copper, manganese, chromium and other ions that are frequently present in waters used for diluting hydrogen peroxide, by incorporating in the hydrogen peroxide solution an ethylenediamine tetra(methylenephosphonic acid) compound. The ethylenediamine tetra(methylenephosphonic acid) compound may be represented by the following formula:

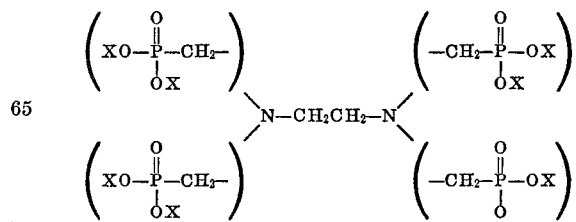

in which the X groups are hydrogen, or one or more of the hydrogens can be replaced with a cation that does not interfere with the function of the compound as a stabilizer, that is a cation that does not catalyze the decomposition of hydrogen peroxide to any significant extent. The various X groups may be the same or different. Typical examples of useful cations are ammonium, substituted ammonium, alkali metals, aluminum magnesium, calcium or tin.

The preferred ethylenediamine tetra(methylenephosphonic acid) compounds are those in which the X groups are hydrogen and those compounds in which one or more of the X group hydrogens are replaced with ammonium, potassium, sodium or combinations thereof.

In addition to being stabilized against decomposition, the aqueous hydrogen peroxide solution when stabilized with a water-soluble ethylenediamine tetra(methylenephosphonic acid) compound is also substantially less corrosive towards metals, especially aluminum, than are prior stabilized hydrogen peroxide solutions.

The addition of any amount of a water-soluble ethylenediamine tetra(methylenephosphonic acid) compound into a hydrogen peroxide solution of any concentration, results in the beneficial effects of inhibiting the decomposition of the hydrogen peroxide and providing a low rate of corrosion of metals by the stabilized hydrogen peroxide solution. The preferred amount of an ethylenediamine tetra(methylenephosphonic acid) compound depends upon the anticipated amount of impurities that may enter the hydrogen peroxide solution to be stabilized. However, the preferred amount of ethylenediamine tetra(methylenephosphonic acid) compound is at least 0.01% and more preferably between 0.03 and 0.5 percent of the weight of the hydrogen peroxide in the aqueous hydrogen peroxide solution. All weight percentages throughout this specification are based upon the weight of the hydrogen peroxide present in the solution unless otherwise stated. The maximum amount of ethylenediamine tetra(methylenephosphonic acid) compound that can be present in the hydrogen peroxide solution is limited only by practical and economic considerations in that concentrations above 1% by weight, although functional, impart little added advantage over lower percentages.

The hydrogen peroxide solution to be stabilized can be at any desired concentration; however, preferred practice is to stabilize concentrated hydrogen peroxide (70% $H_2O_2$ by weight or higher). This stabilized concentrated hydrogen peroxide can be shipped and diluted with "hard" water which contains normal impurities so as to give solutions of such dilutions as may be preferred for handling and storing at users' plants. The incorporation of the stabilizer of our invention into a concentrated hydrogen peroxide solution frequently makes it possible to dilute the concentrated stabilized solution with tap water containing cationic impurities, e.g. iron, copper, manganese, and the like decomposition-inducing contaminants.

The preferred pH of the stabilized hydrogen peroxide solution is between 2 and 2.5 when measured with a glass electrode after the solution has been adjusted to 35% hydrogen peroxide concentration. The stabilizers of our invention function well between a pH of about 1.5 and about 13.5 and adequately even outside this range which may be desired for certain applications. If the pH of the hydrogen peroxide solution is too basic for any particular use, it can be adjusted downward to the desired level with phosphoric acid, nitric acid and/or any other inorganic or organic acid that is inert toward hydrogen peroxide. If the hydrogen peroxide solution is too acidic for any particular use, it can be adjusted to a more suitable level with sodium hydroxide, sodium carbonate and/or other alkaline materials that are inert toward hydrogen peroxide. The pH values stated herein for the hydrogen peroxide solutions are the uncorrected pH values measured with a glass electrode after the solution has been adjusted to 35% by weight hydrogen peroxide.

The effectiveness of ethylenediamine tetra(methylenephosphonic acid) compounds as stabilizers for hydrogen peroxide solutions is substantially enhanced by the presence of water-soluble tin compound. As used herein "water-soluble" includes colloidably dispersible. Examples of useful water-soluble tin compounds are sodium stannate, particularly the trihydrate of sodium stannate, stannic oxide, and metastannic acid. The amount of tin compound required to substantially improve the stability of an ethylenediamine tetra(methylenephosphonic acid) compound stabilized hydrogen peroxide solution is about 0.001% to about 0.3% in the aqueous hydrogen peroxide solution, the percentage being based upon the actual weight of tin in the tin compound used.

The addition of about 0.001 to 0.1% sodium nitrate to the stabilized hydrogen peroxide solution substantially reduces the corrosion of metallic surfaces in contact with the aqueous stabilized hydrogen peroxide solution. Although it is known that adding nitrate ions to a stabilized hydrogen peroxide solution reduces corrosion caused by stabilized hydrogen peroxide, it is surprising that the corrosion results obtained when the stabilizer is this ethylenediamine tetra(methylenephosphonic acid) compound are much superior to the results obtained when nitrate ion is used in conjunction with other stabilizers.

Sodium pyrophosphate is presently used commercially as an additive in stabilized hydrogen peroxide solutions to increase the stability. Sodium pyrophosphate does not have any appreciable effect upon the stability of hydrogen peroxide stabilized with an ethylenediamine tetra(methylenephosphonic acid) compound.

The following examples illustrate the excellent results obtained with ethylenediamine tetra(methylenephosphonic acid) compound. As used in the examples all percentages are weight percentages based upon the total composition. Results of the examples include a decomposition index for the hydrogen peroxide solution. When iron was the decomposition-inducing contaminant, the data for the decomposition indices were determined by storing the solutions for 48 hours at 100° C. in an open flask and then determining the percentage of hydrogen peroxide that decomposed during the 48 hours. When copper was the decomposition-inducing contaminant, the solution was maintained at 100° C. for 24 rather than 48 hours. For all the hydrogen peroxide solutions the determination of the percent of the hydrogen peroxide that decomposed was based upon the assumption that the total weight loss of the flask after the 48 hours (24 hours for copper) was due to the loss of oxygen from the decomposition of hydrogen peroxide. The fraction of the hydrogen peroxide that decomposed was determined and this value times 100 was defined as the decomposition index.

EXAMPLE I

Four 70% hydrogen peroxide solution samples were prepared each containing 100 milligrams/liter (mg./l.) of sodium nitrate. Sufficient stabilizer was added to each sample to make the pH equal to 3.0. The stabilizers added to each solution were (I) the ethylenediamine tetra(methylenephosphonic acid) of this invention, and comparative stabilizers; (A) 1-hydroxyethylidene 1,1-diphosphonic acid; (B) nitrilo tri(methylenephosphonic acid); and, (C) hexamethylenediamine tetra(methylenephosphonic acid).

A decomposition-inducing contaminant (0.1 milligram of iron ion) was added to each liter of solution in the form of $FeNH_4(SO_4)_2 \cdot 12H_2O$. After the first 24 hours of the decomposition index determination the concentration of the decomposition-inducing contaminant was doubled. The decomposition index values of the four hydrogen peroxide solutions were determined. The results are reported in Table I, Row 1 under Decomposition Index, Iron Contaminated. The above procedure was repeated for hydrogen peroxide solutions containing the quantities of sodium pyrophosphate and with quantities of stabilizer to obtain the pH values reported in Table I under Hydrogen Peroxide Solution Composition. As reported in Table I, the complete procedure was repeated using copper ions instead of iron ions as the decomposition-inducing contaminant by adding 0.04 milligram per liter of copper ions in the form of $CuSO_4.5H_2O$ and after the 24 hours at 100° C. the decomposition index was determined. The "copper-contaminated" decomposition index values are reported in Table I.

EXAMPLE II

Hydrogen peroxide solutions were prepared having the same composition as those prepared in Example I except that the decomposition-inducing contaminant was omitted and stabilizer (C) hexamethylenediamine tetra(methylenephosphonic acid) was not tested. Test coupons were partially immersed in 75 milliliters of each solution for 30 days at 66° C. The test coupons consisted of 3" x 1½" x ⅛" pieces of 1060 aluminum (Aluminum Association Standard Designation for Wrought Alloys) that had been annealed at 350° C. for 2.5 hours and passivated with caustic and nitric acid according to the procedure contained in FMC Corporation's Bulletin 104, Appendix H (October 1959), "Special Aluminum Tank Treatments." The corrosion rates of the aluminum test coupons after 30 days were determined and are reported in Table I as mils per year corrosion rates.

TABLE II

| Solution: | Percent decomposition |
| --- | --- |
| I | 7.9 |
| A | 14.4 |
| B | 70.6 |

EXAMPLE IV

A stabilized hydrogen peroxide solution was prepared by first making an aqueous stock solution containing 45 grams $Na_2Sn(OH)_6$ and 79 grams of ethylenediamine tetra(methylenephosphonic acid) per liter, and then adding 6.7. milliliters of this stock solution to one liter of 70% hydrogen peroxide solution. The pH of the stabilized hydrogen peroxide solution was adjusted to 2.0. The decomposition index for the solution based upon 24 hour exposure to the contaminants at 100° C. was determined to be 2.52 after the addition of 5.0 milligrams per liter of iron ions in the form of $FeNH_4(SO_4)_2.12H_2O$ and 0.5 milligram per liter of copper ions in the form of $CuSO_4.5H_2O$ as the decomposition-inducing contaminants.

The data reported in Tables I and II and the result of

TABLE I.—DECOMPOSITION DATA AND CORROSION RATES

| | Hydrogen peroxide solution composition | | | Decomposition index | | | | | | | | | | | | |
| --- | --- | --- | --- | --- | --- | --- | --- | --- | --- | --- | --- | --- | --- | --- | --- | --- |
| | | | | Iron-contaminated and stabilized with— | | | | Copper-contaminated and stabilized with— | | | | Aluminum corrosion rates in mil/year | | | |
| Row No. | Percent $H_2O_2$ | $Na_4P_2O_7$, mg./l. | pH at * 35% | I[1] | A[2] | B[3] | C[4] | I[1] | A[2] | B[3] | C[4] | I[1] | A[2] | B[3] | | |
| 1 | 70 | 0 | 3.0 | 1.6 | 77.9 | 11.8 | 60.6 | 5.2 | 76.4 | 9.2 | 100.0 | 0.01 | 0.07 | 0.06 | | |
| 2 | 35 | 0 | 2.25 | 4.2 | 82.4 | 92.4 | 78.0 | 18.6 | 82.2 | 17.5 | 40.3 | 0.02 | 0.15 | 0.06 | | |
| 3 | 35 | 0 | 1.5 | 1.8 | 1.9 | 3.3 | 3.2 | 3.7 | 2.8 | 5.7 | 12.0 | 0.02 | 0.31 | 0.27 | | |
| 4 | 70 | 30 | 3.0 | 1.6 | 23.8 | 17.9 | 20.4 | 5.4 | 85.5 | 9.6 | 81.2 | 0.02 | 0.08 | 0.11 | | |
| 5 | 35 | 30 | 2.25 | 5.5 | 85.6 | 47.7 | 57.2 | 22.3 | 71.7 | 16.5 | 33.0 | 0.00 | 0.17 | 0.14 | | |
| 6 | 70 | 30 | 1.5 | 2.0 | 1.2 | 2.0 | 1.3 | 1.6 | 1.8 | 2.4 | 5.2 | 0.02 | 0.10 | 0.06 | | |
| 7 | 35 | 340 | 3.0 | 5.4 | 38.6 | 3.8 | 55.4 | 8.9 | 100.0 | 12.8 | 36.1 | 0.02 | 0.17 | 0.06 | | |
| 8 | 35 | 340 | 2.25 | 3.6 | 16.8 | 3.1 | 7.7 | 6.9 | 69.8 | 8.7 | 22.3 | 0.02 | 0.04 | 0.11 | | |
| 9 | 70 | 340 | 1.5 | 0.6 | 1.0 | 2.0 | 1.7 | 1.4 | 1.5 | 3.7 | 5.3 | 0.02 | 0.47 | 0.11 | | |
| 10 | 70 | 30 | 2.25 | 0.8 | 0.9 | 1.6 | 7.0 | 1.8 | 4.4 | 5.8 | 10.7 | 0.01 | 0.13 | 0.08 | | |

[1] I=This invention; ethylenediamine tetra (methylenephosphonic acid).
[2] A=1-hydroxyethylidene 1,1-diphosphonic acid.
[3] B=Nitrilo tri(methylenephosphonic acid).
[4] C=Hexamethylenediamine tetra (methylenephosphonic acid).
*=Sufficient stabilizer (I, A, B or C) was added to the hydrogen peroxide solution to obtain these pH values.

Table 1, row 1, contains the decomposition index and corrosion data for a 70% hydrogen peroxide solution at a pH of 3.0. Reading across row 1, under "Iron Contaminated" the data shows the amount of hydrogen peroxide that decomposed under the test conditions when a stabilizer provided by this invention was used (I) as compared with stabilizers (A), (B) and (C). These figures are 1.6(I) versus 77.9(A), 11.8(B) and 60.6(C). Farther to the right along row 1, are the data for the same comparison between the stabilizer of this invention and the prior art stabilizers when copper was the contaminant. Still farther along to the right on row 1, is the comparison in rates of corrosion of aluminum by the stabilized hydrogen peroxide solution. Rows 2 through 10 contain the analogous data for different hydrogen peroxide solutions having the compositions shown under "Hydrogen Peroxide Solution Composition" and at the pH values to which the solutions were brought by the addition of stabilizer I, A, B, or C.

EXAMPLE III

Three solutions (I, A and B) were prepared each containing 5.0 milliliters of 50% aqueous sodium hydroxide solution; 16.9 milliliters of 50% aqueous hydrogen peroxide; and 39.1 milliliters of water. The pH of the solution was 10.7. Solution I contained 0.42 gram of 95% concentrated ethylenediamine tetra(methylenephosphonic acid); solution A contained 0.50 milliliter of 60% concentrated hydroxyethylidene 1,1-diphosphonic acid; and solution B did not contain any stabilizer. The solutions were heated for 4 hours at 44° C. and the percent of the hydrogen peroxide that decomposed was determined. The results are contained in Table II.

Example IV substantiates the unobvious results obtained with ethylenediamine tetra(methylenephosphonic acid). The improvement in stability and corrosion is both surprising and substantial. Since the decomposition-indices represents the percentage of $H_2O_2$ that decomposed under the test conditions, the data in Table I shows a tremendous improvement in stability over the prior art solutions. The results contained in Row I, Table I, demonstrates the improvements in both stability and corrosion obtained with an ethylenediamine tetra(methylenephosphonic acid) compound. These results show that a 70% hydrogen peroxide solution decomposed only 1.6% when contaminated with iron as compared with decomposition percentages of 77.9, 11.8 and 69.6 with the other stabilizers, and had an aluminum corrosivity of only 0.01 mils/year as compared with 0.07 and 0.06 mils/year with other stabilizers. The synergistic combination of a tin compound and an ethylenediamine tetra(methylenephosphonic acid) compound is demonstrated by the results of Example IV in which only 2.52 percent of the hydrogen peroxide decomposes when the concentration of the decomposition-inducing contaminants were 25 times as great as the concentration used to obtain the data reported in Table I.

We claim:

1. An aqueous hydrogen peroxide solution of low corrosivity and stabilized against decomposition by contaminants, containing a stabilizing amount of a water-soluble ethylenediamine tetra(methylenephosphonic acid) compound.

2. The aqueous stabilized hydrogen peroxide solution of claim 1, in which the water-soluble ethylenediamine tetra(methylenephosphonic acid) compound is present in the amount of between 0.03% and 0.5% of the weight of the hydrogen peroxide in the stabilized hydrogen peroxide solution.

3. The aqueous stabilized hydrogen peroxide solution of claim 2 in which ethylenediamine tetra(methylenephosphonic acid) compound is the acid.

4. The aqueous hydrogen peroxide solution of claim 1, further comprising a water-soluble tin compound present in an amount such that the weight of the tin is between 0.001 and 0.3% of the weight of the hydrogen peroxide in the stabilized hydrogen peroxide solution.

5. The aqueous hydrogen peroxide solution of claim 4 further comprising nitrate ions persent in an amount such that the weight of the nitrate ions is between 0.001 and 0.1% of the weight of the hydrogen peroxide in the stabilized hydrogen peroxide solution.

6. The aqueous stabilized hydrogen peroxide solution of claim 1, further comprising nitrate ions present in an amount such that the weight of the nitrate ions is between 0.001 and 0.1% of the weight of the hydrogen peroxide in the stabilized hydrogen peroxide solution.

7. A process of stabilizing an aqueous hydrogen peroxide solution comprising combining with the aqueous hydrogen peroxide a stabilizing amount of a water-soluble ethylenediamine tetra(methylenephosphonic acid) compound.

8. The process of claim 7 further comprising combining a water-soluble tin compound with the aqueous hydrogen peroxide solution in an amount such that the weight of the tin is between 0.001 and 0.3% of the weight of the hydrogen peroxide in the stabilized hydrogen peroxide solution.

9. The process of claim 8 further comprising combining nitrate ions with the hydrogen peroxide solution in an amount such that the weight of the nitrate ions is between 0.001 and 0.1% of the weight of the hydrogen peroxide in the stabilized hydrogen peroxide solution.

References Cited
UNITED STATES PATENTS

| | | | |
|---|---|---|---|
| 3,053,634 | 9/1962 | Luten, Jr., et al. | 23—207.5 |
| 3,383,174 | 5/1968 | Carnine et al. | 23—207.5 |
| 3,387,939 | 6/1968 | Reilly et al. | 23—207.5 |
| 2,599,807 | 6/1952 | Bersworth | 260—502.5 |
| 2,904,517 | 9/1959 | Baker | 423—584 |
| 3,483,133 | 12/1969 | Hatch et al. | 252—389 |

OSCAR R. VERTIZ, Primary Examiner

H. S. MILLER, Assistant Examiner

U.S. Cl. X.R.

260—502.5